Aug. 26, 1947.  B. O. CHARTRAND  2,426,388
DENTAL IMPRESSION TRAY
Filed June 6, 1944

INVENTOR.
Browning O. Chartrand
BY J. E. Trabucco
ATTORNEY

Patented Aug. 26, 1947

2,426,388

UNITED STATES PATENT OFFICE 2,426,388

DENTAL IMPRESSION TRAY

Browning O. Chartrand, San Jose, Calif.

Application June 6, 1944, Serial No. 538,899

3 Claims. (Cl. 32—17)

This invention relates to improvements in dental equipment, and more particularly to an adjustable tray for use in making an impression of an alveolar ridge.

One of the reasons why dental plates used in supporting artificial teeth are sometimes not particularly satisfactory as to comfort or fit is because the soft tissues of the alveolar ridge are not maintained in their normal shape during the making of the dental impression. A distortion of the tissues through the application of a greater pressure upon certain areas of the alveolar ridge than upon other areas when the impression material is brought into contact with the said ridge usually results in the dental impression having a shape corresponding to the contour of the distorted tissues. The denture constructed from the dental impression thus made will not particularly fit the alveolar ridge when its tissues assume their normal shape, thereby causing an unseating of the denture, accompanied by considerable discomfiture. By pre-shaping the dental impression tray so it properly fits upon the alveolar ridge before the application of the colloidal or other suitable impression material, will avoid a distortion of the tissues when the impression is made. A dental impression thus made will assume the normal shape of the alveolar ridge, and the plate subsequently taken therefrom will correctly and accurately fit without the presence of abnormal discomforting pressures on certain areas of the ridge.

An object of my invention is to provide an adjustable dental impression tray having a construction which is capable of being shaped to correctly fit upon a person's alveolar ridge, preparatory to the making of an impression thereof.

Another object of my invention is to provide an adjustable impression tray having a material holding member which may be adjusted as to length to fit upon alveolar ridges of various sizes.

Other objects and advantages will be pointed out hereinafter, indicated in the appended claims, or will be obvious to one skilled in the art upon an understanding of the present disclosure. For the purpose of this application I have elected to show herein certain forms and details of adjustable impression trays representative of my invention; it is to be understood, however, that the embodiments of my invention herein shown and described are for the purpose of illustration only, and that therefore they are not to be regarded as exhaustive of the variations of the invention, nor are they to be given an interpretation such as might have the effect of limiting the claims, short of the true and most comprehensive scope of the invention in the art.

Figure 1:
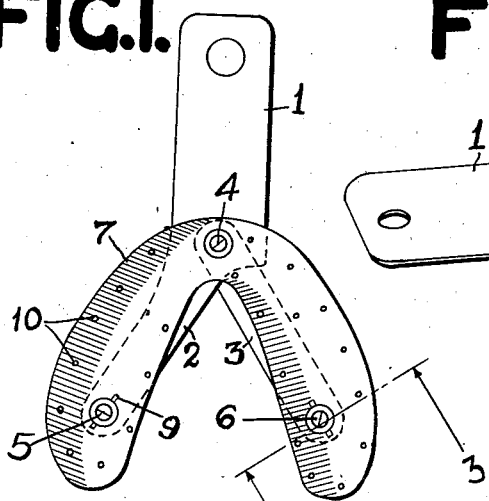
Fig. 1 is a bottom view of a dental impression tray embodying the principles of my invention.
Figure 2:
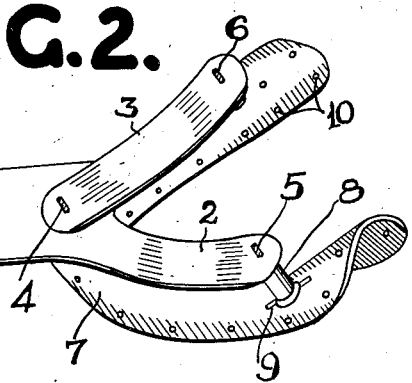
Fig. 2 is a perspective view of the same.
Figure 3:
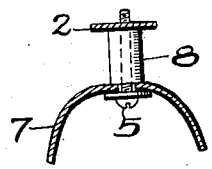
Fig. 3 is an enlarged sectional view taken on the line 3—3 of Fig. 1.
Figure 4:
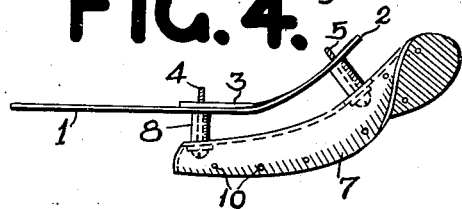
Fig. 4 is a side view of the same.

Referring first to Figs. 1, 2, 3 and 4, there is shown an adjustable tray supporting frame comprising a handle 1, a rigid arm formed integrally with a handle and an adjustable pivoted arm 3. The handle and the arms being angularly disposed with respect to one another constitute a Y-shaped frame. The arm 3 is pivotally secured by a screw or other suitable means to the handle 1 at a point adjacent the juncture therewith of the rigid arm 2.

Secured to the frame by screws 4, 5 and 6 or other suitable means is an impression tray 7 which is used to hold a colloidal material when the latter is applied upon an alveolar ridge for the purpose of making a dental impression. The impression tray embodies a somewhat U-shaped construction which is formed to substantially assume the lengthwise curvature of an average alveolar ridge. The central part of the tray 7 is secured by the screw 4 to the end of the handle 1 at a point where the arms 2 and 3 join the same, while the end portions of the said tray are adjustably secured to the said arms respectively, by the screws 5 and 6. Tubular spacing elements 8 extending around the screws 4, 5 and 6 maintain the tray in spaced relation to the supporting frame. The end portions of the tray where the screws 5 and 6 extend therethrough are slotted as at 9 to permit the bending upwardly or downwardly of the said end portions. The tray is formed with curved side edges throughout its length which are so arranged as to provide a substantially U-shaped saddle which is adapted to extend over the alveolar ridge along the latter's entire length. The tray is formed with a number of holes 10 throughout its length which receive the colloidal impression material and provide means for retaining the said material in the tray after the impression is made by bringing it into engagement with the alveolar ridge. The impression tray is made from a pliable inelastic material such as lead, tin, or a metallic composition, thus permitting the bending of the tray 7 or the relative adjustment of the end portions thereof to effect a proper fit upon an alveolar ridge preparatory to the making of an impression thereof. The ends of the tray may be bent upwardly or downwardly, or they may be adjusted relative to one another when the screws 4, 5 and 6 have been unscrewed sufficiently to provide a loose engagement between the spacing elements 8 and the said tray. The slots 9 permit the ends of the tray to be bent upwardly or downwardly or to be moved toward or away from one another. The screw 4 being the pivotal means connecting the arm 3 with the rigid part of the frame allows the said arm to be adjusted in a manner which will bring the end portions of the tray toward or away from one another. The tray, being made from a soft pliable material may be trimmed or cut at its edges to bring about a proper fit with respect to the alveolar ridge upon which it is being fitted. In practice the screws 4, 5 and 6 are first loosened to permit the reshaping of the tray to bring about its substantial conformity to the shape and contour of the alveolar ridge of which an impression is to be made. After this is done the screws are again tightened to make the frame rigid and to hold the reshaped tray in place thereon. The alginate or colloidal material usually employed in making impressions is placed in the channel of the tray, and the latter is placed in the manner of a saddle over the alveolar ridge. Some of the material passes into the holes 10, thereby providing means which will cause the impression to adhere to the tray when the latter is removed from the person's mouth.

Figure 5:
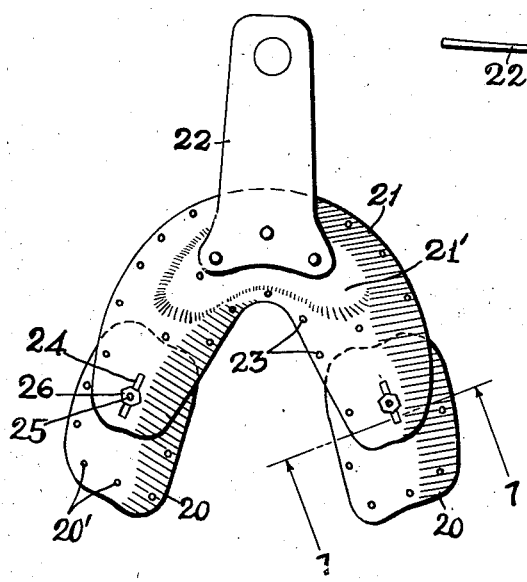
Fig. 5 is a plan view of a modified embodiment of my invention.
Figure 6:
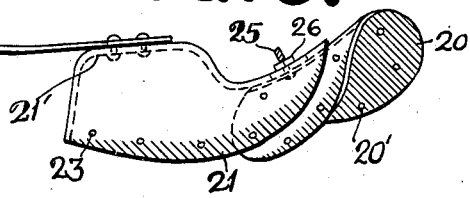
Fig. 6 is a side view of the same.
Figure 7:
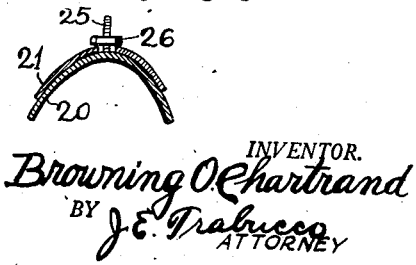
Fig. 7 is a sectional view taken on the line 7—7 of Fig. 5.

In the embodiment of my invention shown in Figs. 5, 6 and 7, I have shown saddle-like extensions 20 adjustably secured to the ends of a rigid tray 21. The tray 21 is provided with a handle 22, and with a number of holes 23 for receiving the impression material as heretofore described. The particular type tray shown on the drawings is designed for use in making an impression of the lower alveolar ridge, there being a front concave portion 21' adapted to receive several remaining front teeth which may happen to still be present in the patient's mouth. My invention may be embodied in other types of trays if so desired. The saddle-like extensions 20 are slotted longitudinally as at 24, and screws 25 secured to the tray and engaged by nuts 26 extend through the slots and provide means for adjustably securing the said extensions to the tray. The extensions are also provided with a plurality of holes 20' for receiving the impression material. The extensions 20 are made from a pliable material such as lead, tin or metal composition, and each may be extended or retracted with respect to the ends of the rigid tray 21 so as to provide adjustable means adapted to fit alveolar ridges of different lengths and shapes.

Having described my invention, what I claim is:

1. In a dental impression tray, a substantially Y-shaped frame having a rigid handle and two relatively adjustable angularly arranged arms secured at adjacent ends to the handle, a substantially U-shaped channelled impression tray pivotally secured to the arms of the frame and having a shape corresponding generally to the contour of a person's alveolar ridge, the said tray being made from a material permitting the tray to be reshaped and laterally adjusted in accordance with the adjustment of the arms of the frame while being fitted inside a person's mouth and means fixedly securing said tray and arms together in desired shaped and adjusted conditions.

2. A dental impression tray comprising a pliable impression tray member having a material holding channel and being manually deformable over and to the shape of an alveolar ridge, a relatively rigid frame member pivotally connected to said tray member and having angularly adjustable arms, pivotal means adjustably connecting the free ends of said arms to end portions of the tray member, and frictional locking means associated with said pivotal connecting means for fixedly securing said tray and frame members in manually deformed conditions.

3. The structure set forth in claim 2, wherein spacing means adjustably connect the tray and frame members for manual shaping of the tray.

BROWNING O. CHARTRAND.

REFERENCES CITED

The following references are of record in the file of this patent:

UNITED STATES PATENTS

| Number | Name | Date |
|---|---|---|
| 1,054,999 | Thein | Mar. 4, 1913 |
| 2,118,980 | Montgomery et al. | May 31, 1938 |
| 720,105 | Brouillet | Feb. 10, 1903 |
| 347,976 | Starr | Aug. 24, 1886 |
| 1,044,614 | Wightman | Nov. 19, 1912 |
| 1,094,203 | Eaton | Apr. 21, 1914 |
| 1,104,662 | Grier | July 21, 1914 |
| 1,461,209 | Bridges | July 10, 1923 |
| 1,563,955 | Barton | Dec. 1, 1925 |
| 1,499,973 | Douglass | July 1, 1924 |

FOREIGN PATENTS

| Number | Country | Date |
|---|---|---|
| 619,140 | Germany | Sept. 23, 1935 |